Jan. 25, 1966     L. C. ROTTER ETAL     3,231,136
APPARATUS FOR DISPENSING MEASURED QUANTITIES OF MATERIAL
Filed Aug. 3, 1964     2 Sheets-Sheet 1

Lutwin C. Rotter,
George Weitzel,
Inventors.
Koenig, Senniger,
Powers and Leavitt,
Attorneys.

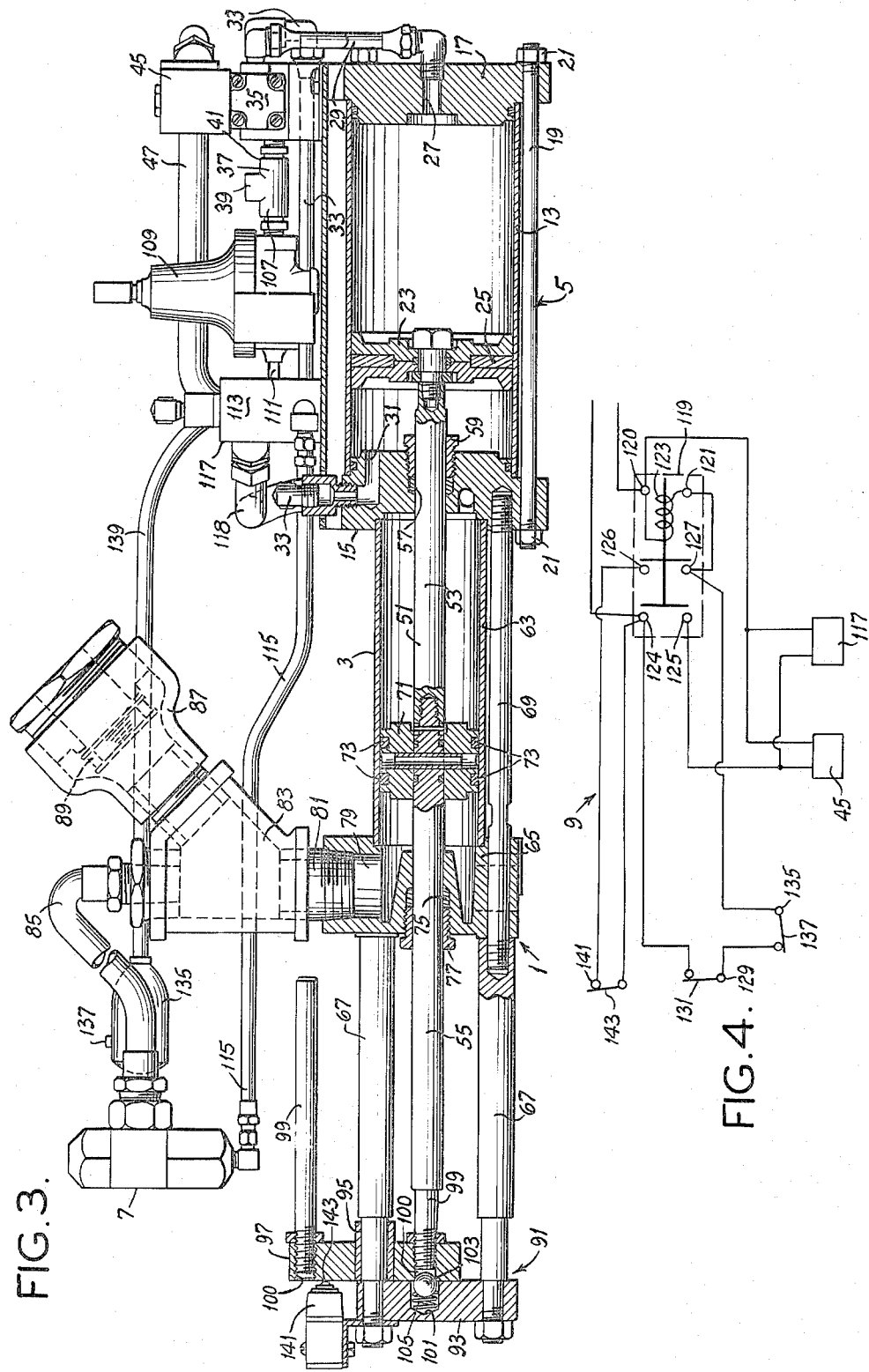

United States Patent Office 3,231,136
Patented Jan. 25, 1966

3,231,136
APPARATUS FOR DISPENSING MEASURED
QUANTITIES OF MATERIAL
Lutwin C. Rotter, Ladue, and George Weitzel, Bridgeton, Mo., assignors to McNeil Corporation, a corporation of Ohio
Filed Aug. 3, 1964, Ser. No. 386,950
15 Claims. (Cl. 222—76)

This invention relates to dispensing apparatus, and more particularly to apparatus for dispensing measured amounts of a pumpable material through a nozzle. The pumpable material may be a plastic molding composition, such as a plastisol, for example, which is delivered via the nozzle into a mold for filling the mold.

The invention is concerned with an improvement on the dispensing apparatus shown in U.S. Patent 3,081,913 of Lutwin C. Rotter, one of the inventors herein, issued March 13, 1963, and entitled Dispensing Apparatus. Said patent shows a dispensing apparatus comprising a double-acting pump cylinder, with the opposite ends of this cylinder alternately connected via a valve to a source of the material to be pumped under pressure and a nondrip nozzle, the piston in this cylinder being actuated by pressure of the pumpable material first on one side of the piston to force out material on the other side of the piston to the nozzle, then by pressure of the pumpable material on the other side of the piston to force out material on said one side of the piston to the nozzle, with means for varying the length of stroke of the piston to vary the amount delivered on each stroke of the piston.

Among the several objects of this invention may be noted the provision of an improved dispensing apparatus of the general class shown in said patent, but which is adapted for dispensing of material without requiring high pressurizing of a source of the material sufficient to operate the pump, utilizing a single-acting reciprocating measuring pump mechanically operated by a reciprocating air motor; the provision of a dispensing apparatus such as described in which the pump is automatically actuated through a pressure or discharge stroke and back through a return or intake stroke by manual operation of a control, and more particularly an electrical control; the provision of a dispensing apparatus such as described which also automatically operates the nondrip nozzle; and the provision of a dispensing apparatus such as described having means for varying the amount of material delivered on each dispensing operation. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, FIG. 1 is a plan view of a dispensing apparatus of this invention with the nozzle and related elements for delivery of material from the pump omitted;

FIG. 3 is a longitudinal cross section of the FIG. 1 apparatus, showing the dispensing nozzle and the elements connecting it to other portions of the apparatus; and FIG. 4 is a wiring diagram.

Corresponding reference characters indicate corresponding parts throughout the several views of the drawings.

Figure 1:
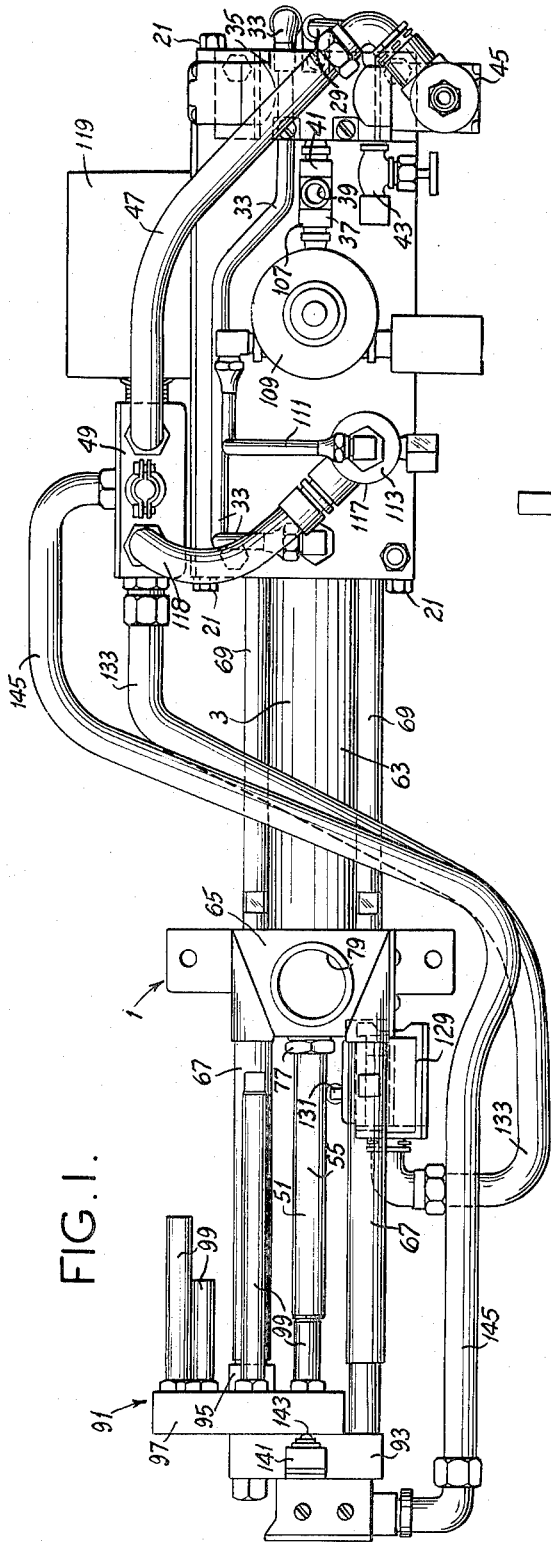
Figure 2:
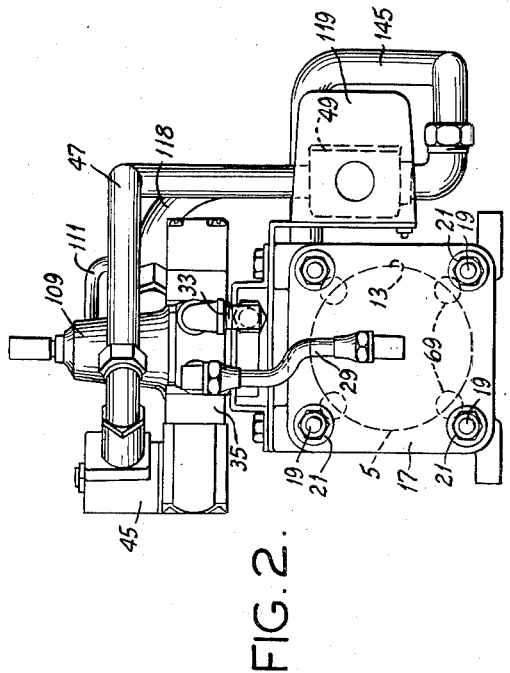
FIG. 2 is a view of the right end of FIG. 1.

Referring to the drawings, a dispensing apparatus of this invention is indicated generally at 1 and is shown to comprise a measuring pump unit 3 driven by an air motor 5. The material pumped by the pump unit 3, such as a plastisol, is delivered to a nondrip nozzle 7 (FIG. 3). An electric circuit 9 (FIG. 4) controls operation of air motor 5 and nozzle 7.

The air motor 5 comprises an air cylinder 13 having a left end head 15 and a right end head 17 as shown in FIG. 3 held on the ends of the cylinder by tie rods 19 and nuts 21. The air motor piston is indicated at 23, and the packing for the piston is indicated at 25.

A passage 27 in end head 17 is in communication with cylinder 13 and an air line 29. The end head 15 has a passage 31 which provides communication between cylinder 13 and an air line 33. The air lines 29 and 33 are connected to ports of a solenoid operated four-way valve 35 which is adapted to provide air under pressure through the air lines to one end of the cylinder 13 while discharging air from the other end and subsequently reversing the flow of air, thereby reciprocating the piston 23 in cylinder 13.

A T-shaped coupling or fitting 37 has a leg 39 for connection to a source (not shown) of air under pressure and one branch 41 of the T 37 is connected to the inlet port of the valve 35. The exhaust or discharge outlet of the valve 35 is shown at 43 in FIG. 1. The valve 35 is controlled by a solenoid 45 forming a part of the valve. The electrical conductors for the solenoid 45 pass through a cable 47 connected to the solenoid and to a junction box 49. The valve 35 is normally open to air line 33 to move piston 23 toward the right end of the cylinder 13 adjacent the head 17. When the solenoid 45 is energized the valve directs air through the line 29 against the right side of piston 23 to move it to the left in cylinder 13 while simultaneously exhausting air from the left end of the cylinder through passage 31 and air line 33.

A piston rod 51 has a section 53 attached to the piston 23 and a section 55 threaded in the left end of section 53. Section 53 of the piston rod 51 reciprocates in the left end head 15 and extends into the pump unit 3. A packing 57 in left end head 15 surrounds rod 51 and is held in place by a gland 59.

The measuring pump unit 3 has a tubular pump cylinder 63. The right end of cylinder 63 abuts the left end head 15 of air motor 5 and the left end of cylinder 63 is closed by a pump left end head 65. Rods 67 project outwardly from the pump head 65. Connecting rods 69 extend through the pump head 65 and are threaded into the rods 67 and the left end head 15 of the air motor 5. As best seen in FIG. 3, the cylinder 13 and 63 of the air motor 5 and pump 3, respectively, are substantially coaxial.

Section 55 of the piston rod carries a piston 71 in pump cylinder 63. Packing rings 73 of piston 71 engage the inner surface of cylinder 63. The sliding connection between the piston rod 51 and the pump end head 65 is sealed by a packing 75 held in place by a gland 77.

The pump end head 65 has a laterally extending passage or opening 79 in communication with cylinder 63. The opening 79 is connected by a fitting 81 to a Y-shaped coupling 83 (FIG. 3). A hose 85 connects one branch of the coupling 83 to the nozzle 7 and the other branch of the coupling 83 is connected to a reducer 87 which is adapted to be connected to a source (not shown) of pumpable material, such as plastisol. The reducer 87 mounts a check valve 89 which opens on the suction stroke of pump 3 for the passage of material through the coupling 83 to the pump cylinder 63. As the pump piston 71 is moved to the left by the piston rod 51, material in the cylinder 63 is forced through the coupling 83 and hose 85 to the nozzle 7.

Stop means indicated generally at 91 are engageable by the piston rod 51 for determining the length of the stroke of the pistons 23 and 71 and thus the amount of pumpable material delivered to the nozzle 7. The stop means 91 comprise an end plate or block 93 mounted on the left end of rods 67. A bushing 95 is mounted on one of the rods 67. An index head 97 rotates and moves axially on the bushing 95. A plurality of studs or stops 99 are threaded into sockets 100 in the index head 97 and project toward the pump unit 3. The studs 99 are spaced equal distances from the axis of bushing 95 or the center of the index head and the studs are of different length so that when moved into axial alignment with the end of piston rod 51, the studs 99 serve to stop the piston rod at different positions in its stroke.

The end plate 93 has a recess 101 which contains a ball 103. A coil spring 105 reacts from the bottom of recess 101 against the ball 103 biasing the ball against the index head 97, thereby urging the index head toward the pump unit 3. When the piston rod 51 engages the stud 99 on the index head 97, the index head moves against the spring 105 and into engagement with the end plate 93. The ball 103 is substantially in line with the axis of the piston rod 51 and is received in the inner end of the sockets 100 which mount the studs 99, thereby functioning as a detent holding the index head in whatever index position it may be set.

The nozzle 7 may be identical to that shown in FIG. 4 of U.S. Patent 3,081,913. The nozzle is normally open and receives air under pressure to close the nozzle. Air is provided to the nozzle 7 from the branch 107 of the T 37. The branch 107 is connected to an air regulator 109 which governs pressure of air delivered through an air line 111 to a three-way solenoid valve 113. An air line 115 connects an outlet of the valve 113 to the head end of the nozzle 7. The valve 113 has a solenoid 117. A cable 118 connected to the solenoid 117 and the junction box 49 receives conductors for the solenoid 117. The valve 113 is normally open to line 115 to provide air to the nozzle 7 for holding the nozzle closed. Operation of the solenoid 117 closes the air valve 113 so that the nozzle 7 can be opened by a spring mechanism in the valve (not shown).

Solenoids 45 and 117 (and thus the valves 35 and 113) are controlled by the circuit 9 shown in FIG. 4. A relay 119 (FIGS. 1 and 4) has a pair of terminals 120 and 121 connected to the armature winding 123 of the relay. Relay 119 also has two sets or pairs of terminals 124, 125 and 126, 127 which are normally open and which are closed when the circuit to the armature winding 123 is closed. Relay terminals 120 and 124 are connected to a source of electric energy. The solenoids 45 and 117 are in parallel and are connected to the terminals 120 and 125. Thus when armature winding 123 is energized to close the relay, current is provided to both of the solenoids 45 and 117 to operate the valves.

A normally closed micro switch 129 is mounted on one of the rods 67 and the actuator 131 of this switch is engaged by the forward end of the piston rod 51 as it is extended from the pump 5 for opening the switch. The conductors for switch 129 are in a cable 133 (FIG. 1) connected to the switch and to the junction box 49.

A normally open manually operated micro switch 135 (FIGS. 3 and 4) has a movable contact 137 which is depressed by the operator of the dispensing apparatus to initiate operation of the pump and provide material to the nozzle 7. Conductors for the switch 135 are in a cable 139 connected to the switch and the junction box 49. The switches 129 and 135 are in series and are connected to relay terminals 124 and 127. Terminals 121 and 127 of the relay are interconnected so that when the micro switch 129 is closed, the operator can close switch 135 and current is provided to the armature winding 123 of the relay, thereby closing the relay and completing a circuit between contacts 124 and 125 and also between contacts 126 and 127. This closes the circuit to the solenoids 45 and 117 to operate the valve 35 and 113, respectively. Valve 35 then provides air under pressure to the right side of piston 23 in the air motor 5 to extend the piston rod 51 and, simultaneously, the valve 113 is closed to stop flow of air to the nozzle 7, thereby opening the nozzle. As piston rod 51 is extended from the pump unit 3, it engages the movable contact 131 of switch 129 to open the latter.

A normally closed micro switch 141, which may be referred to as a limit switch, is mounted on the end plate 93 and has a movable contact 143 positioned to be engaged by the index head 97 when it is moved against spring 105 thereby to open switch 141. As the index head 97 is moved toward the pump unit 3 by spring 105, the movable contact 143 is extended to close the switch. The conductors for switch 141 are in a cable 145 connected to switch 141 and junction box 49. The switch 141 is connected to relay terminals 124 and 126 and provides a holding circuit for the armature winding 123. When the relay 119 is closed, current is provided from terminal 124 through switch 141 to terminal 126, across the relay to terminals 127 and 121 and to the armature winding 123.

Operation of the dispensing apparatus is as follows:

Assuming the piston 23 is adjacent the right end head 17 of the air motor 5 and the valve 113 is open to provide air under pressure to the nozzle 7 to close the nozzle, the index head 97 is out of contact with the movable contact 143 of limit switch 141 and the piston rod 51 and stud 99 are in spaced relation. The operator places the dispensing end (upper end in FIG. 3) of the nozzle 7 in a mold opening and depresses the movable contact 137 of switch 135 to close the circuit including the micro switch 129 and the armature winding 123 of the relay 119. This closes the relay and places the solenoids 45 and 117 in the circuit. These solenoids operate the valves 35 and 113, respectively to shut off the supply of air to the nozzle 7 and direct air through the air line 29 and into the right end of cylinder 13 of the air cylinder. The left end of cylinder 13 is vented via passage 31, line 33 and valve 35. The air under pressure moves the piston 23 to the left in the cylinder into the FIG. 3 position. Piston 23 moves the piston rod 51 and the piston 71 in the pump cylinder 63 to the left. Assuming the pump cylinder 63 was primed with material, the material in the pump cylinder is forced through the lateral opening 79, the coupling 83 and hose 85 to the nozzle 7 and delivered to the mold. During initial movement of the piston rod 51 to the left, the actuator 131 of the micro switch 129 is moved to open this switch but the relay 119 remains closed due to the holding circuit provided by switch 141.

As piston rod 51 travels to the left, it engages the indexing head 97 and moves it against the spring 105 until the movable contact 143 of limit switch 141 is retracted into the housing of the switch to open the switch. This opens the holding circuit for the relay 119 and the relay opens and takes the solenoids 45 and 117 out of the circuit. Valve 113 thereby returns to its normally open position and air under pressure is provided to nozzle 7 to close the nozzle. Simultaneously, the four-way valve 35 is closed so that air under pressure is provided through air line 33 and passage 31 into the cylinder 13 and air on the right side of the piston 23 is discharged to the atmosphere through the valve 35. The air under pressure entering cylinder 13 on the left side of piston 23 moves the piston 23 toward the right until the piston engages the end head 17. The pump piston 71 is also moved to the right with the piston 23 and it draws material through the valve 89 and the coupling 83 into the left end of the pump cylinder 63, thereby priming the pump for the next cycle of operation.

As piston rod 51 moves right, the switch 141 is closed by the spring 105 biasing the index head 97 away from the contact 143. When the piston rod 51 passes the contact 131 of switch 129, it is extended to thereby close the switch. The operator of the apparatus need only depress the contact 137 of switch 135 to again initiate operation of the dispensing apparatus.

The amount of material dispensed by the apparatus is varied by rotating the index head 97 on the bushing 95, thereby aligning studs 99 of different lengths with the piston rod 51 and regulating the movement of the piston rod and the pump piston 71.

If material is supplied to pump port 79 under some pressure, this may be utilized to drive piston 71 through a return stroke, and four-way valve 35 may be replaced by a three-way valve which supplies air to and vents air from the right end of the air motor only. In such case, pistons 71 and 23 are driven by air on a pumping stroke only, and returned by pressure of the material. This type of arrangement may be somewhat slower in operation, but may better ensure filling of the measuring chamber in pump 3 to the left of piston 71.

In view of the above, it will be seen that the several objects of the invention are achieved and other advantages results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Dispensing apparatus comprising an air motor having a cylinder and a piston movable therein, an air valve for alternately directing air under pressure to and venting air from opposite ends of said motor to move the piston, a measuring pump cylinder coaxial with the air motor and having a piston movable therein, means for connecting one end of the pump cylinder with a source of pumpable material, a nozzle for receiving material pumped from the one end of said pump cylinder, a piston rod connected to both pistons and projecting from said pump cylinder, stop means engageable by the piston rod for determining the length of the stroke of the pistons, valve control means associated with the stop means the valve for reversing air flow from the valve to the air motor, thereby reversing the direction of movement of the piston therein, and said nozzle being air operated, said apparatus having a second air valve for providing air under pressure to said nozzle.

2. Dispensing apparatus as set forth in claim 1 wherein said valve is solenoid operated and said valve control means includes a switch operable by said piston rod engaging said stop means.

3. Dispensing means as set forth in claim 1 wherein said stop means comprises a rotatable index head spaced from said pump cylinder, and a plurality of studs of various lengths projecting from said index head and engageable by said piston rod.

4. Dispensing apparatus comprising an air motor having a cylinder with a piston movable therein, a solenoid operated four-way air valve for alternately directing air under pressure to and venting air from opposite ends of said cylinder to move the piston, a measuring pump cylinder substantially coaxial with said air cylinder and having a lateral opening at one end, a nozzle for receiving material pumped from said measuring pump cylinder, a Y-shaped coupling connecting the opening of the pump cylinder with said nozzle and with a source of pumpable material, a piston in said pump cylinder, a piston rod connected to both pistons and projecting from said pump cylinder, stop means engageable by the piston rod for determining the length of the stroke of the pistons, valve control means associated with the stop means and the valve for reversing air flow from the valve to the air cylinder, thereby reversing the direction of movement of the piston therein, a second solenoid operated air valve, and an air line connecting the second valve to said nozzle, said nozzle being adapted to be closed when air under pressure is supplied thereto.

5. Dispensing apparatus as set forth in claim 4 having an electric circuit for operation of the solenoids of said valves, said circuit comprising a normally open relay having contacts connected to the solenoids, a normally closed micro switch and a manually controlled switch connected in series with the armature of the relay to close the relay contacts when both switches are closed, thereby closing the circuit to the solenoids, the micro switch being engaged and opened by said piston rod during initial movement of said rod away from the pump cylinder, and a holding circuit for the relay armature including a second normally closed micro switch, said second micro switch being opened by said piston rod engaging said stop means to thereby open the relay contacts and the circuit to the solenoids.

6. Dispensing apparatus comprising an air motor having a piston therein, a measuring pump cylinder having a piston operatively connected to the air motor piston for conjoint movement therewith, electrically operated valve means for alternately directing air against opposite sides of said air motor piston thereby moving both pistons, said pump cylinder having an outlet for receiving and discharging pumpable material, and a control circuit for said electrically operated valve means adapted to reverse flow of air to said motor, said control circuit including a relay having contacts connected to said electrically operated valve means to operate the valve means, a manually controlled switch for closing the contacts of the relay, and a micro switch in a holding circuit for the relay, said micro switch being normally closed and opened to break the circuit to the valve means.

7. Dispensing apparatus as set forth in claim 6 having a piston rod connected to said pump piston and movable therewith between two positions, said piston rod projecting from said pump cylinder and being adapted to throw said micro switch when it reaches one of said positions.

8. Dispensing apparatus as set forth in claim 6 wherein said control circuit further includes a second micro switch in series with said manually operated switch and associated with said piston rod to be operated by said piston rod when the piston rod is near its other position of movement.

9. Dispensing apparatus comprising a measuring pump and a fluid-actuated motor for actuating the pump, said pump comprising a cylinder and a piston reciprocable therein, said motor comprising a cylinder and a piston reciprocable therein, said motor piston being operatively connected to said pump piston for operation of the latter through a pumping stroke and a return stroke, said pump cylinder being adapted for discharge of material being pumped from one end of the pump cylinder on a pumping stroke and for intake of material into the same end of the pump cylinder on a return stroke, a valve for alternately directing fluid under pressure to and venting fluid from opposite ends of the motor cylinder for actuating the motor to drive the pump piston through a pumping stroke and a return stroke, means for manually actuating said valve to a position for driving the pump piston through a pumping stroke, means responsive to completion of a pumping stroke for actuating said valve to a position for driving the pump piston through a return stroke, said valve being a solenoid valve, and said means for manually actuating the valve comprising a manually operable switch, and said means responsive to completion of a pumping stroke comprising a limit switch operable by the pump piston.

10. Dispensing apparatus as set forth in claim 9 having a fluid-actuated nozzle and means for supplying fluid under pressure to and venting fluid from the nozzle comprising a valve and means for actuating the latter valve in response to actuation of said manually operated switch and deactuating the latter valve in response to actuation of said limit switch.

11. Dispensing apparatus comprising an air motor having a cylinder and a piston movable therein, an air valve for alternately directing air under pressure to and venting air from said motor to move the piston, a measuring pump cylinder coaxial with the air motor and having a piston movable therein, means for connecting one end of the pump cylinder with a source of pumpable material, a nozzle for receiving material pumped from the one end of said pump cylinder, a piston rod connected to both pistons and projecting from said pump cylinder, stop means engageable by the piston rod for determining the length of the stroke of the pistons, valve control means associated with the stop means and the valve for controlling air flow from the valve to the air motor, thereby controlling movement of the piston therein, said nozzle being air operated, and said apparatus having a second air valve for providing air under pressure to said nozzle.

12. Dispensing apparatus as set forth in claim 11 wherein said valve is solenoid operated and said valve control means includes a switch operable by said piston rod engaging said stop means.

13. Dispensing means as set forth in claim 11 wherein said stop means comprises a rotatable index head spaced from said pump cylinder, and a plurality of studs of various lengths projecting from said index head and engageable by said piston rod.

14. Dispensing apparatus comprising an air motor having a cylinder and a piston movable therein, an air valve for alternately directing air under pressure to and venting air from opposite ends to said motor to move the piston, a measuring pump cylinder coaxial with the air motor and having a piston movable therein, means for connecting one end of the pump cylinder with a source of pumpable material, a nozzle for receiving material pumped from the one end of said pump cylinder, a piston rod connected to both pistons and projecting from said pump cylinder, stop means engageable by the piston rod for determining the length of the stroke of the pistons, valve control means associated with the stop means and the valve for reversing air flow from the valve to the air motor, thereby reversing the direction of movement of the piston therein, said air valve being solenoid operated, said stop means comprising a rotatable index head spaced from said pump cylinder, a plurality of studs of various lengths projecting from said index head and engageable by the piston rod, and said valve control means comprising a switch in a circuit to said air valve, said switch being actuated by engagement between said piston rod and said studs.

15. Dispensing apparatus comprising an air motor having a cylinder and a piston movable therein, an air valve for alternately directing air under pressure to and venting air from said motor to move the piston, a measuring pump cylinder coaxial with the air motor and having a piston movable therein, means for connecting one end of the pump cylinder with a source of pumpable material, a nozzle for receiving material pumped from the one end of said pump cylinder, a piston rod connected to both pistons and projecting from said pump cylinder, stop means engageable by the piston rod for determining the length of the stroke of the pistons, valve control means associated with the stop means and the valve for controlling air flow from the valve to the air motor, thereby controlling movement of the piston therein, said air valve being solenoid operated, said stop means comprising a rotatable index head spaced from said pump cylinder, a plurality of studs of various lengths projecting from said index head and engageable by said piston rod, and said valve control means comprising a switch in a circuit to said air valve, said switch being actuated by engagement between said piston rod and said studs.

References Cited by the Examiner
UNITED STATES PATENTS

| | | | |
|---|---|---|---|
| 1,932,976 | 10/1933 | Lamb et al. | |
| 1,984,296 | 12/1934 | Witter | 222—43 |
| 2,388,662 | 11/1945 | Anderson et al. | 222—309 X |
| 2,553,788 | 5/1951 | Richardson et al. | 222—334 X |
| 2,769,573 | 11/1956 | Miller | 222—43 |
| 2,905,361 | 9/1959 | Noall | 222—309 X |
| 3,081,913 | 3/1963 | Rotter | 222—43 X |

M. HENSON WOOD, JR., *Primary Examiner.*

RAPHAEL M. LUPO, *Examiner.*